United States Patent [19]

Hogg

[11] Patent Number: 4,719,704
[45] Date of Patent: Jan. 19, 1988

[54] UNITIZED VEHICLE MEASURING GAUGE AND GAUGING SYSTEM

[76] Inventor: John W. Hogg, 165 Camden Crescent, London, Ontario, Canada, N5X 2J6

[21] Appl. No.: 912,550

[22] Filed: Sep. 29, 1986

[51] Int. Cl.⁴ .............................................. G01B 5/25
[52] U.S. Cl. ....................................... 33/288; 33/608
[58] Field of Search ............ 33/180 AT, 181 AT, 288

[56] References Cited

U.S. PATENT DOCUMENTS

| | | | |
|---|---|---|---|
| 4,321,754 | 3/1982 | Colby | 33/288 |
| 4,366,624 | 1/1983 | Bergstrom | 33/288 |
| 4,446,608 | 4/1984 | Clausen | 33/180 AT |
| 4,479,305 | 10/1984 | Wendl et al. | 33/180 AT |
| 4,498,242 | 2/1985 | Celette | 33/180 AT |
| 4,561,187 | 12/1985 | Powell | 33/180 AT |

FOREIGN PATENT DOCUMENTS 703713  2/1965  Canada .......................... 33/180 AT Primary Examiner—Richard R. Stearns
Attorney, Agent, or Firm—Mitches & Co.

[57] ABSTRACT

A gauge which in its preferred form consists of two vertical members and two cross bars with means for relatively adjusting the relative position of the cross bars on the vertical members is disclosed. Each of the cross bars also carries a pair of threadable castings together with a reversely threaded screw which, on rotation, moves the threadable casting toward and away from the center of each cross bar. When a plurality of such gauges are employed, one located in each of preselected cross-sectional planes of a vehicular body, the dimensions of the boey relative to datum references and from the gauge can be determined and thereupon whether the vehicle be damaged or "true" and hence undamages. Such gauges avoid the use of prior art racks and frames upon which the vehicle was placed in order to measure the vehicle trueness.

7 Claims, 19 Drawing Figures

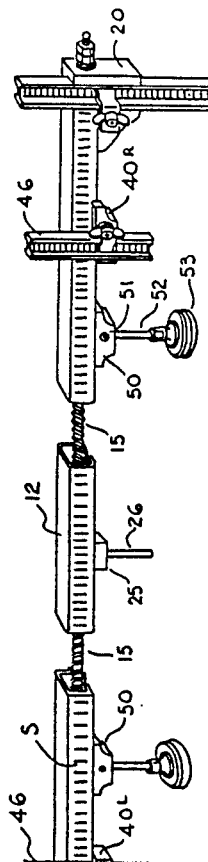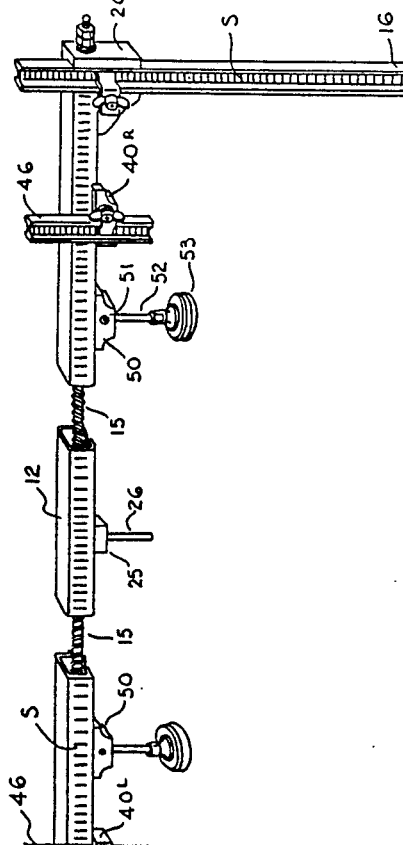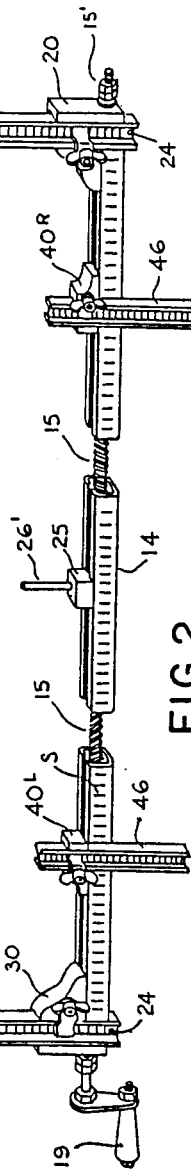
FIG.2
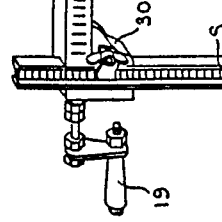
FIG.2B
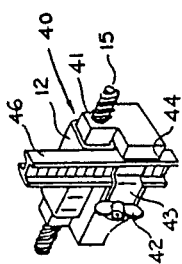
FIG.2A
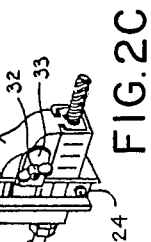
FIG.2C
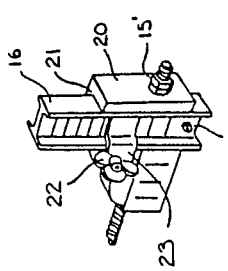
FIG.2D

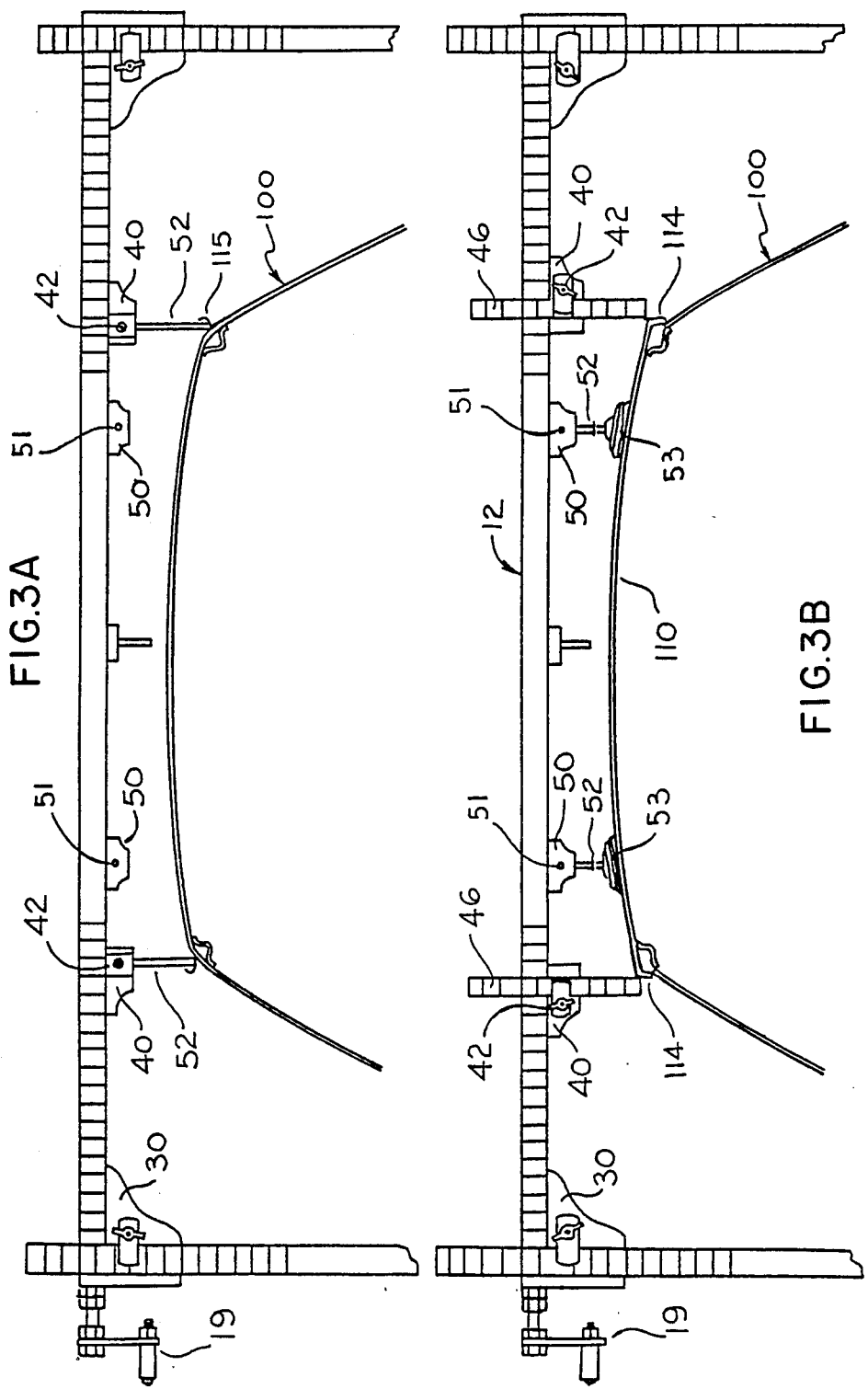

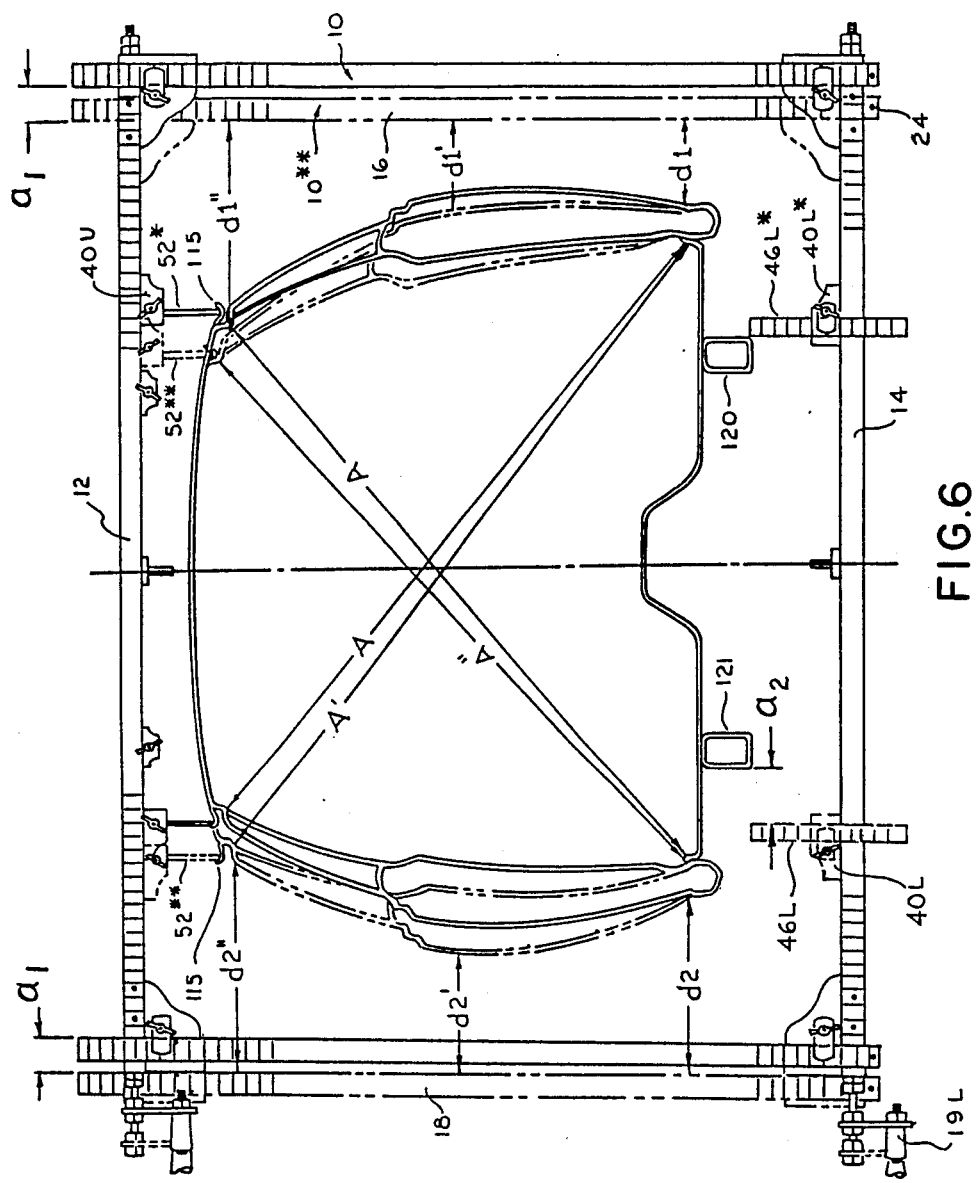

UNITIZED VEHICLE MEASURING GAUGE AND GAUGING SYSTEM

The invention relates to a universal, fully adjustable measuring gauge system for the purpose of, when connected to a damaged, unitized or unicoup automobile body, locates and measures the extent of relative misalignment caused by the collision. A plurality of gauges within the system remain in place and serve as a guide during the repair procedure, to indicate when the various sections, panels, and other components of the body are correctly aligned. Three gauges are normally cooperatively used on the system, but in my preferred embodiment, the same employs 4 gauges within the gauge system.

It is contemplated that each one of the gauges of my novel system check and locate any lateral, vertical and symmectrical misalignment through that cross-section of the vehicle co-planar to where the gauge is mounted. When at least 3 identical gauges, preferably 4 or more gauges are spacially placed along the longitudinal length of the vehicle, a clear identification of any longitudinal misalignment is readily apparent as will be hereinafter explained; whether the longitudinal misalignment occurs over the upper; along the lateral sides or the bottom of the vehicle.

In order to understand the background of the invention, with greater clarity, it is appropriate to historically review automobile vehicular design.

There are two distinct types of vehicle designs; the conventional; and, the newer unitized—sometimes called unicoup and/or space frame, (i.e. the "Fiero" vehicle that is produced in North America by General Motors Corporation, Detroit, Mich., U.S.A.).

A conventional vehicle design is one which has a separate, heavy-membered frame, to which all the chassis parts and the body are bolted. The frame is considered the backbone of the vehicle. The frame side rails are usually a box or C channel 100 mm to 150 mm in height. The top view would show 2 identical shaped side rails joined together by cross-members—each side rail being parallel and symmetrical to the other. They could therefore share a common longitudinal centre line.

The unitized vehicle does not have a separate frame. Relatively light gauge, box-section sub-frame members are welded to the lower part of the vehicle to produce a reinforced body shell of considerable strength and twist resistance. The complete body and box section members become an integral support unit to the engine, power train, running gear assemblies and their respective loads and forces. Both the conventional and unitized vehicle side views would indicate a relatively level centre section with a "kick-up" over the rear axle and front suspension areas.

Both types of vehicles, for descriptive purposes, can be divided into 3 sections and 5 control points. The 3 sections are the front, centre, and rear. The front section consists of the area from the radiator support to the cowl or front door front hinge pillar area. The centre section is from the hinge pillar or instrument panels to the rear seat area. The rear section is from the front of the rear wheel to the back of the vehicle.

The 5 control points or control areas are the radiator support area, the front suspension mounting areas (sometimes called towers), the cowl area, the rear door area, the rear wheel area, and the rear cross-member (trunk) area. In order for a vehicle to be correctly aligned, the cross-sectional dimensions of the components throughout these areas must be in concert with those of the vehicle as they would have been prior to any damage to the vehicle, (according to the manufacturer's original manufacturing specifications). Further, the dimensions between the various areas, from one area to another, must also coincide with the manufacturer's specifications.

When either of these 2 distinctly different designed vehicles are involved in a collision, and depending on the amount of force involved, and the direction of the collision hit, either vehicle type would tend to follow one or a combination of different misalignment conditions. These are loosely referred to as sag, mash, kick-up or kick-down, sway, twist and diamond.

The true diamond condition in a conventional frame vehicle is present when one complete frame rail is driven back on a horizontal plane. With a unitized vehicle, this seldom occurs. The diamond condition is more apt to be found in the lateral and vertical cross-sections of the body through any of the 5 control point areas. It is therefore necessary to check the vehicle's lateral, vertical and symmetrical squareness at each of the control areas as well as the other common longitudinal damage conditions. The suspension mounting towers, on a unitized vehicle with a MacPherson suspension system, are the most critical areas of correct body alignment as these tower positions control the front wheel alignment. The towers are not directly connected to each other and are often driven (back, out, in, or squashed down, or up), independent of each other, and independent from the rest of the complete front section which also might have any one or more of the other common misalignment faults.

When the frame, on the conventionally designed vehicle, is damaged it would assume one or more of the prementioned damage patterns. After it was straightened, the body is aligned to fit the frame; the doors etc. to fit the body.

The 2 main prior art concerns in straightening the frame were to have the side rails on the same horizontal plane and symmetrical to each other. This is checked by measuring from identical points on each rail to a common longitudinal centre line.

It is common in the prior art to use a self-centering type of gauge to check this type of frame. A self-centering gauge consists of 2 parallel horizontal bars, held lightly by a centre housing. The bars are so designed to move inward or outward equal distances. A short vertical centre pin mounted in the housing always remains in the centre from the ends of the 2 bars. Each end of the horizontal bar is connected to a short vertical rod or hanger which in turn is hung from identical locations on each frame side rail. A typical prior art selfcentering gauge is disclosed in U.S. Pat. No. 4,442,608 issued Apr. 17, 1984, and entitled "Vehicle Frame Measurement Device."

When a number of these self-centering guages are spaced throughout the length of the frame and hung from corresponding locations on the side rails, all the centre pins can be easily sighted. All the pins should line up, if the frame side members are symmetrical to each other. If, for example, there is a sway in the frame, the centre sighting pins will not be aligned. Each of the horizontal bars of the centering gauges can also be sighted, as they should be parallel with each other if the frame is in a level horizontal plane.

Self-centering gauges of the prior art are hard to install as they are installed from under the car. They often slip out of adjustment due to the free "hanging" method of connecting the gauge to the frame. It is difficult to sight the centre pins and generally necessary to lay on one's stomach, with one eye closed when sighting.

If the width of the frame rails has changed as a result of collision, i.e. one rail only has moved out or in, at the area where a gauge is hung, the centre pin may not be in the true centre, even though the frame can be longitudinally straight.

The prior art only measures the horizontal plane and the longitudinal centre line of the frame. The prior art does not measure any of the upper body alignment points; nor can it be used to measure the wheel tracking nor wheel alignment. Prior art self-centering gauges must be used as a set of 3, preferably 4. One single prior art gauge will not check nor measure anything by itself.

When unitized vehicles were first developed, these same prior art self-centering gauges were used by hanging them from the floor panel of the unitized vehicle. However, and again, as with conventional (channel) frame vehicles and the like, only measurements of the horizontal plane of the floor panel were achieved; no measurement of any upper body damage nor distortion. Further limitations to the prior art is the nonmeasurement of any spacial distance or location for the upper MacPherson suspension tower mount. This measurement is the most critical attribute in a unitized vehicular design.

In unitized vehicles the lower sub-frame members are welded to the floor panel, and sometimes are not mounted symmetrically to each other. One sub-rail or section can be off centre as to facilitate the mounting of a gas tank for example. This intentional frame configuration makes the centre pin of the prior art self-centering gauge, when hung in this section, appear off centre, giving a false reading (indicating a sway in the frame when, of course there is none).

Since these earlier prior art self-centering gauges are not satisfactory, a new measuring/aligning device referred to as the bench system (either dedicated or universal) was developed.

The dedicated bench system, now also prior art, is one where specially made jigs designed for a certain brand or manufacturer of unitized vehicle are bolted onto a very heavy steel framework. The vehicle is then placed on top of these jigs. The body lower floor panel locating points line up to the jig pins if, or when, the body is correctly aligned. The universal system is similar to the dedicated bench system but with adjustable sets of jigs and pointers that can be adjusted to fit the body floor panel locating alignment points for each specific unitized vehicles. Generally, the jigs must be reset for each model. Such prior art system is disclosed by Van Dalen in U.S. Pat. No. 1,110,530 issued Jan. 1, 1920, entitled "Method and Apparatus for Reforming and Straightening Vehicles".

The prior art bench systems aforesaid measure only the bottom of the floor panel for its horizontal plane. Those skilled in the art will appreciate that there are a number of existing deficiencies with the prior art system, for example; often the suspension and sometimes the engine must first be removed before the vehicle can be "put on the bench". The upper body areas are not easily measured. The bench and jig system must be used as a complete unit; parts of the jigs cannot be used separately to measure one section of a vehicle or used alone; a considerable storage area is needed to store the bench and fixtures when not in use. With the dedicated bench system of the prior art, a new set of jigs must be purchased for each different make of car.

With the universal bench system, according to the prior art, the same tends to be hard to "set" to each different vehicle. Since it is fastened to the bench, and pointers or jigs adjusted from it to meet the bottom of the floor panel datum points, when the vehicle damage is pulled, should the complete car move a slight bit in the bench hold down clamps, then all the pointers or jigs must be re-adjusted to fit the repositioned body datum locations—a time consuming operation.

With either type of prior art bench systems, a special blueprint specification chart book is meeded to install or to set the jigs and measuring points for each different type of vehicle. During the straightening/pulling process, if the operator is not careful, it is possible to also pull and therefore bend the jigs and/or adjustable measuring pointers.

The bench and the jigs for such systems are expensive.

SUMMARY OF THE INVENTION

The invention herein described provides an effective and efficient alternative to the prior art while having a high degree of accuracy through use of a simplified gauging procedure.

The novel gauge system is universal in that it can be used on any vehicle either conventional or unitized, enabling this novel system to check the complete vehicle including the upper body areas.

All current gauging systems now in use, use the centre line of the vehicle as their base or datum reference. The invention centres the vehicle in each of its plurality of gauges and comparison measurements are made from each gauge to identical positions on the vehicle. Each gauge checks the control point or area to which it is positioned for the body shell lateral distance, vertical height and symmetrical shape through the plane of the gauge.

When 3 (preferably 4) gauges of my invention are "set" at the control points, the longitudinal alignment of the body can be easily located by sighting lengthwise through the vertical hangers and the horizontal bars associated with each gauge.

A further sighting improvement is obtained by connecting a small resilient or string cord from gauge to gauge, at the same position on the vertical hanger of one gauge or the cross bar, to the same position on the next and adjacent gauge and hence, cascading from adjacent gauge to adjacent gauge in a similar manner. A very clear indication of any misaligning is then readily apparent. Measurements can also be taken from any position along the cords to any position on the body. Identical measurements can be made from opposite sides providing a comparison check for equal distances. This procedure is especially helpful and time saving and avoids moving the gauge when an item or area suspected of damage is situated between 2 gauges. (For example, the body door hinge mounting area or a suspension part.) The two comparable distances from the cords to the identical areas or surfaces (side of the vehicle) on the body should be equal.

The invention preferably contemplates that each gauge of my novel gauge system be a rectangular shape having 2 fixed length, horizontal cross-bars adapted to be placed laterally across the vehicle interconnected by 2 vertical hangers. Each horizontal cross-bar and vertical hanger have a measuring scale of 2 m (2000 mm). The rectangular gauge surrounds a lateral cross-section of the vehicle and defines a lateral cross-section through the vehicle allowing comparison of the distances from the gauge to the sides, the top, and the bottom of the vehicle. If that cross-section of the vehicle is symmetrical and centered within the gauge framework, then all comparable measurements should be equal. If there be distortion in the symmetry of the vehicle, the dimensions will not correspond and this will become apparent hereafter.

As previously mentioned, the sub-frame that welds to the floor panel may not be symmetrical with its opposite side. However, this does not affect the fit or alignment of the gauge to other datum points in the same area of the body.

The invention contemplates a vehicular body-and-frame measurement gauge for use in realigning the structure of a damages vehicle having reference points comprising:

(a) two vertical members, each identically scaled with indicia along one surface thereof;
(b) a cross bar having its longitudinal length scaled and carrying;
  (i) means at either end for attachment to one of each of the vertical members whereby to arrange the vertical members and the cross bar into a generally U-shaped configuration;
  (ii) a pair of adjustable block means carried by the cross bar adapted to be adjustably positioned therealong.

Preferably the aforesaid gauge has two identical cross bars.

In another aspect, the invention contemplates a vehicle frame measuring and aligning apparatus comprising a plurality of the aforesaid gauges, preferably at least two and as many as five, wherein the length of the vertical and horizontal members are each greater than the average width and height of a vehicle, and thus about 2 meters. A plurality of gauges thus may be located on the vehicle body, in respective parallel planes, spacially disposed along the longitudinal axis of a vehicular body, the planes orthogonal to that axis. Measurements of the body to the gauge components can easily be made to determine whether the body has been otherwise damaged or distorted.

The invention will now be explained by way of example and reference to the accompanying drawings in which;

FIGS. 3A and 3B are upper sections along line III—III (or IV—IV) of FIG. 1 (the sections coincident to the vertical laterally extending planes C or D) showing the upper cross arm of my of FIG. 2 and its alternative means for mounting to the upper portion of the roof of the vehicle of FIG. 1;

FIG. 6 is a view similar to those of FIGS. 4 and 5, but with both side panels and roof distorted as a result of upper body movement, particularly the side walls, creating a sectional diamond distortion through that lateral cross-section of the body.

Figure 1:
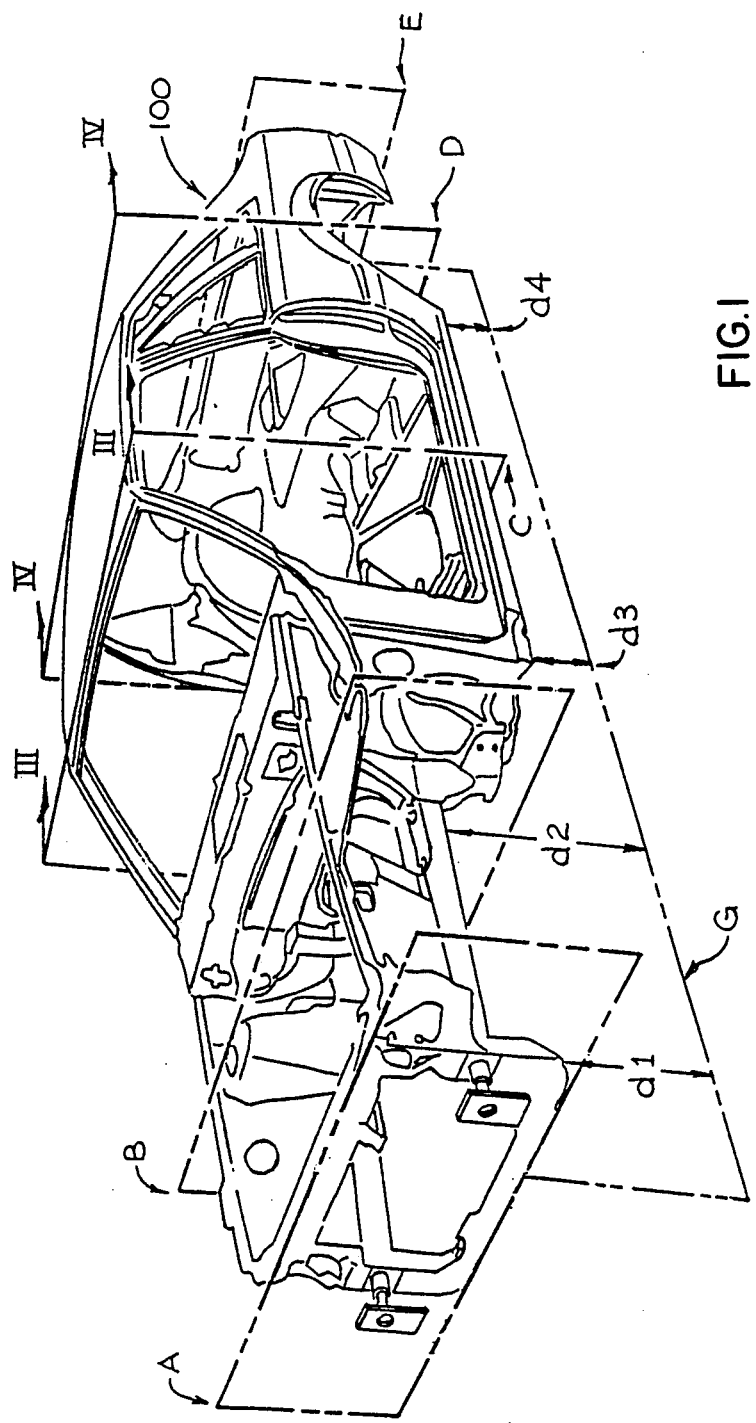
FIG. 1 is a perspective of a unitized vehicle illustrating its longitudinal datum line therefor, and a plurality of control planes thereof.

Referring to FIG. 1, any vehicular body 100 may be coordinated with five vertical planes A through E, vertically oriented and lateral to the longitudinal axis of the vehicle. For practical purposes the first plane A (see FIGS. 7, 8 and 10) intersects with the front bumper; the second plane B parallel thereto, across what is known as the MacPherson strut towers; plane C at the upper margin of the front windshield and hence through the frontal portion of the passenger compartment; plane D through the rear door—rear axle areas of the vehicle; and, plane E intersectiing the rear cross member which normally carries the rear bumper. A datum plane G generally runs beneath the vehicle longitudinally, under the floor panel.

Figure 12:
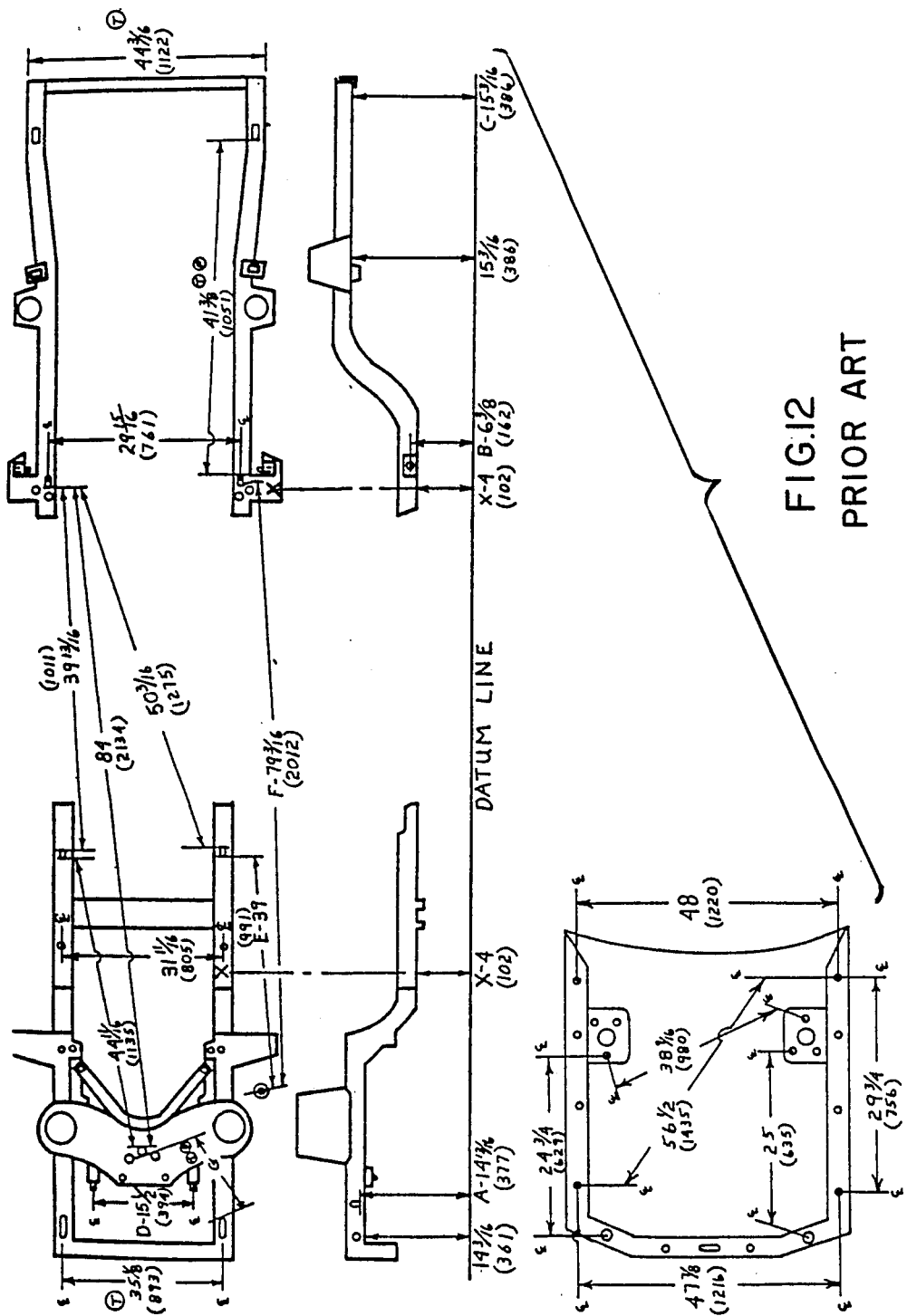
FIG. 12 are typical prior art diagrams, the centre of which is a longitudinal datum line reference for a given vehicle model of a specified manufacturer.

Referring, for the moment therefore to the prior art datum diagram of FIG. 12, the same is for a 1983 Ford Mustang and the diagram itself was copyrighted 1983 by Harry M. Depue and James L. Cannifax. Those skilled in the art will know that a service can be obtained where a plurality of such datum diagrams for various vehicle models can be purchase providing the dimensional distance between relevant important components of the body frame. In FIG. 12, those skilled in the art will clearly understand that one view is a longitudinal datum reference diagram. My novel gauges are to be used in the plurality of planes, preferably as set forth in FIG. 1, and measurements can be made from my gauge to the various "control points" of the vehicle and compared with the equivalent ones shown on the datum line or in the bottom view diagram or top view underhood of FIG. 12. The actual gauge measurements, on the one hand, and the datum figure measurements coresponding to those found on FIG. 12 for that given model car, can then be compared to determine whether the vehicle actually being tested is not swaged in any of the planes A through D of FIG. 1, nor between the respective planes, in a manner as will become more apparent hereafter. In such application, the various datum dimensions illustrated in FIG. 12 between those portions of the respective body noted between the arrowheads can be determined. The number in the "brackets" wherever it happens to appear in FIG. 12, is the dimension in millimeters, while the number immediately above it, in inches.

Figure 2E:
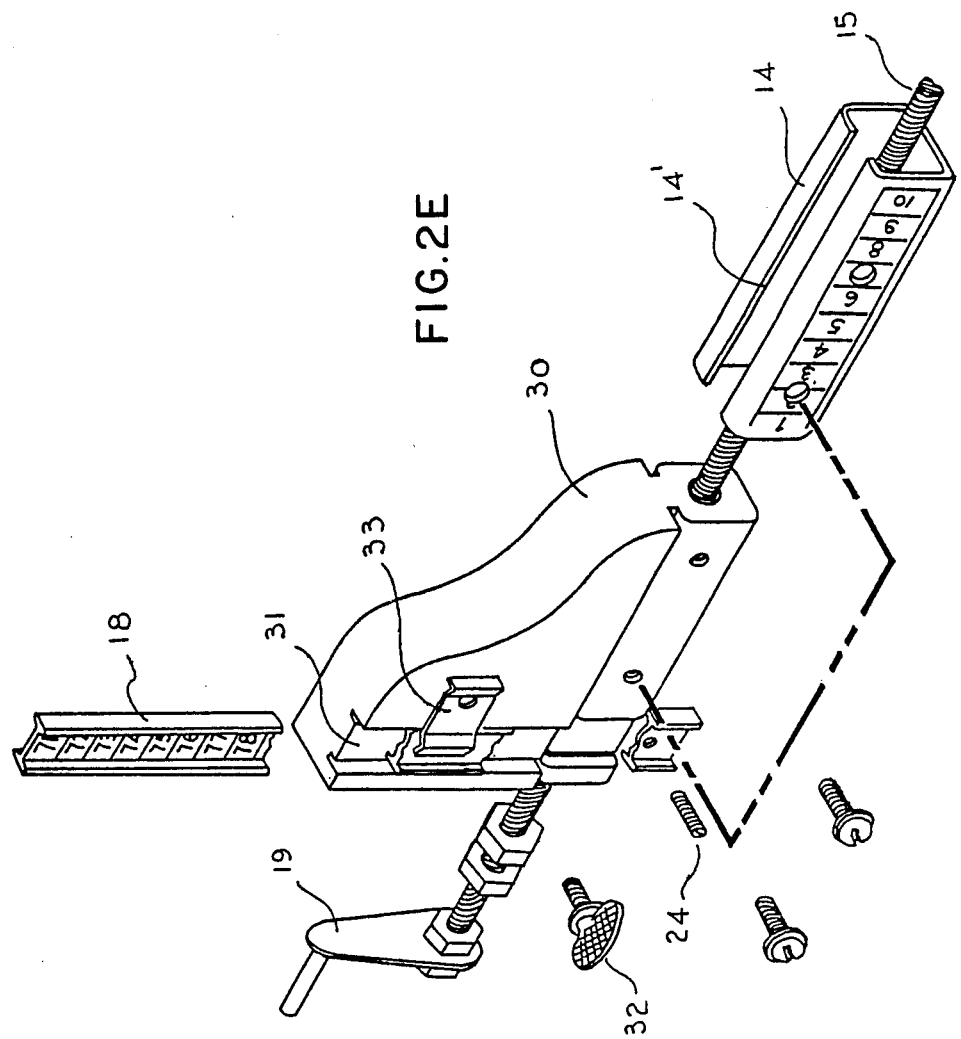
FIG. 2 is an exploded partial sectional, perspective veiw of my novel gauge with exploded perspectives of the more pertinent operating components thereof as FIGS. 2A, 2B, 2C, 2D and 2E.

Referring to FIG. 2, my novel gauge 10 may be located to intersect any of the planes A through E of FIG. 1 and preferably, at least three of such gauges 10 are to be used and as many as five may be used. The gauge 10 therefore consists of two horizontal hollow bars 12 and 14 and two vertical members 16 and 18, generally with I-beam cross section. The cross bars 12 and 14 terminate at one end, see FIG. 2D, at a fixed end block or casting 20 while the other end 30 a mirror is the same fixed casting, FIG. 2C. Through both fixed castings 20 and 30, and extending through the hollow cross bar 14, a left and right hand thread shaft 15 extends so that one proximate end terminates at a crank 19 exterior of the end casting 30, while the opposite (distal) end of the thread screw is free to rotate in end block 20, and is terminated there by double nuts 15'. Casting 20 is more particularly shown in FIG. 2D while casting 30, in FIGS. 2C and assembly FIG. 2E. Each of the castings 20 and 30 have a vertical race 21 and 31 into which slidingly mates with one end of respective vertical members 18 and 16. A threaded thumb screw, respectively 32 or 22 threads down into a threaded hole defined by the castings and urges against an underlying finger plate 33 and 23 respectively to urge the distal end of that finger plate against the channel surface of either vertical member 16 or 18, as the case might be, so as to secure the same fixed relative to the end casting. By loosening off the respective thumb screws 22 and 32, the finger plates 23 and 33 become slack and the horizontal bar may be moved toward or away the opposite horizontal bar 14 so as to change the dimensional distance between horizontal cross bars 12 and 14. The four castings 20 and 30 are similarly constructed, but at the bottom end of each of the vertical pieces 16 and 18 are pins 24 not only to prevent the bottom horizontal member 14 from falling off the vertical members 16 and 18, but more particularly to act as bottoming points to keep the lower cross bar 14 in its correct position relative to the vertical members 16 and 18. As will become apparent I prefer that the bottom cross member 145 be stayed against stop pins. I prefer that the length of the vertical members 16 and 18 be 2 meters and that of the horizontal cross bar 2 meters. This leaves sufficient opening bounded by the members and cross bars so as to accommodate therebetween a cross-sectional segment of the vehicle 100 of FIG. 1 irrespective of where the gauge be placed coincident with any of the planes A through F. The vertical members 16 and 18 are scaled at S in either inches or millimetres and similarly, the cross bars are scaled at S. Preferably the scaling is with the centre of the cross bars 12 and 14 being dimensioned at the centre with 1000 millimeters while at opposite ends at 0. At the centre of each cross bar, and referring to FIG. 2, the threaded shaft 15 extends through a central carrier 25 with a depending centre pin 26 for the upper cross bar 12 or an uprising pin 26' for the lower cross bar 14. The crank 19 may be rotated clockwise or counter clockwise to move a pair of laterally movable castings 40 to travel toward or away from each other, because the castings 40R and 40L are oppositely threaded to travel along, respectively, right hand or left hand segments of the threaded shaft 15. Both left and right hand threades of the shaft 15 have the same but opposite flights, hence rotation of the crank 19 will move threadable castings 40 toward or away from the centre pin 26 an equal dimension and at equal speed. Each threaded casting 40 has a vertically oriented race 44 which nestingly accommodates a second scaled, vertically oriented piece 46, with I-beam cross-section, Similarly, a thumb screw 42 bears against an underlying finger 43 that frictionally urges against the vertical straight piece 46 to constain it at a given scaled distance from its respective cross bar 12 or 14. Turning of the crank 19 therefore moves the vertical scaled pieces 46 toward and away from the vertical end bars 16 and 18, as well as from the centre; and, as will become apparent hereafter, the relative distance of segments of the vehicular body from these threaded castings 40 assist in determining the "squareness"—nor swage from datum—of the vehicular body so it may be straightened to its proper position, if not according to datum through the cross-section of the plane, or affirmed, if true to datum.

A second but slidable pair of castings 50 are carried on the upper cross bar 12. These castings 50 do not migrate on rotation of the crank 19, but are adapted to slide in a longitudinal race 12', defined by the underside of the upper cross bar 12 (see FIG. 2B). In all but this respect the cross bars 12 and 14 are mirrors of one another. A removable pin, or set screw 51 is provided in the slidable castings 50 and extends orthogonally through to a removable stem 52 that penetrates a mating aperture defined by the casting 50. To the lower end of the stem 52 is a removable pivoting magnet member 53. By removing the pin or turning of the set screw 51, the stem 52 may be removed; alternatively, the magnet 53 may be removed from the stem 52 because the upper portion of the magnet 53 has a friction accommodating socket for the stem. As will become apparent, the slidable castings 50 are used to position the upper cross member 12 onto the upper segment of the vehicle so that gauge 10 may be suspended in any of the respective planes A through E as may be required. Hereafter, we will discuss the mounting of the gauge 10 into planes C or D, as an example, understanding that it may be similarly located into any of the other planes. Where the body skin is not metalic, and hence plastic and the like, the magnet 53 may be a suction cup.

Referring to FIG. 3B, slidable castings 50 are located and to them are appended the stem 52 and the pivoting magnet member 53. The gauge 10 is suspended from the roof 110 of the vehicle so that the pivoting magnet members 53 are mated thereto. The crank 19 is turned so that the threadable castings 40 are negotiated so that their scale pieces 46 urge against opposite exterior margins of the roof profile as at 114. The vertical scaled members 46 of each of the threadable castings 40 are located on identical scale locations at the top of the cross bar 12 by the clamp finger 13 and the set screw 42 so that they urge against the opposite idential points of the margin 114 as shown. The roof section 114 is now located equally between the two vertical members 16 and 18 of the gauge (i.e. centred) and the height of the upper cross bar 12 from the roof corners 114 is equally even. When two such gauges are so placed, one in plane C and the other in plane D, the roof section is defined between the cross bars 12 of the two adjacent gauges in planes C and D.

As an alternative method of assembling the gauges on the vehicle, and not using the slidable castings 50, requires that the scale 46 of the threaded casting be removed by loosening off the screw 42. In the race 44, not seen in FIGS. 2, but seen in FIG. 3A, the thumb screw 42 is completely withdrawn and the finger plate 43 removed. The thumb screw 42 is then reinserted into its threaded hole and the stem 52 from the sliding blocks 50, removed and placed into an aperture, not seen in the figuers, on the underside of the threadable block 40; the thumb screw 42 being turned down upon it to hold the stem 52 therein. Similarly, the crank 19 is turned so that the threaded castings 40 are positioned whereby the distal end of the stems 52 engage the gutter 115 of the vehicle. The gauge again is suspended either in plane C or D and would automatically have centred, the roof in the verticals of the two adjacent gauges. Since the pins 52 are the same length in each gauge, they would hold the upper cross bar 12 the same relative distance from the gutter 115 (parallel to the roof plane if no damage). This latter approach, and referring to FIG. 3A, is to be used in the location of the guages in the other planes, other than C and D, as it is a more convenient method. It will be apparent, now to those skilled in the art, that the gauge is self-centred in each of the respective planes when placed coincident to the planes and on the vehicle. This is unlike the self-centring systems of the prior art and, as will become more apparent hereafter, avoids the need of a rack or "bench" upon which a car, according to the prior art, is to be placed, if gauges of the prior art are to be used.

Figure 4:
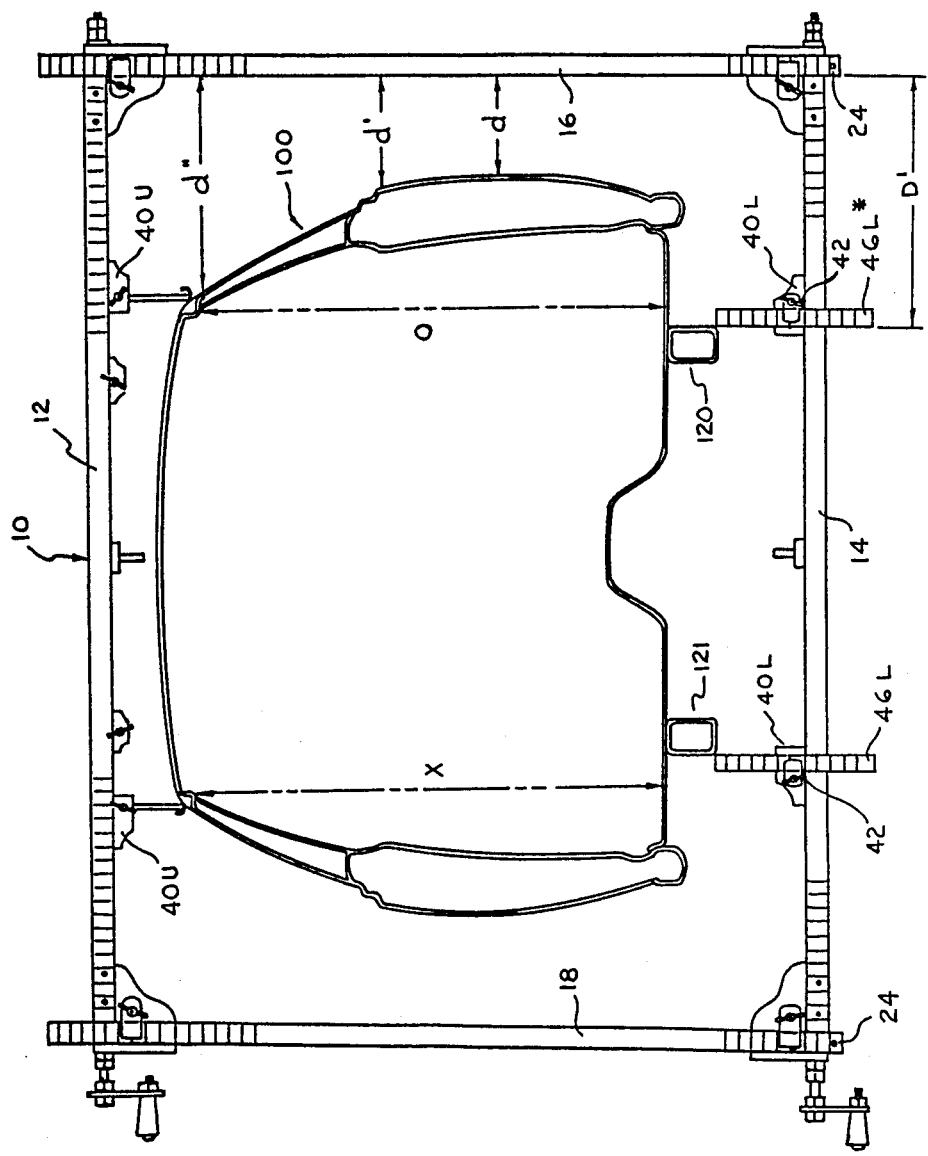
FIG. 4 is a section along section lines III—III or IV—IV of FIG. 1, being a plan view of the gauge of FIG. 2, in use in planes C or D.
Figure 11:
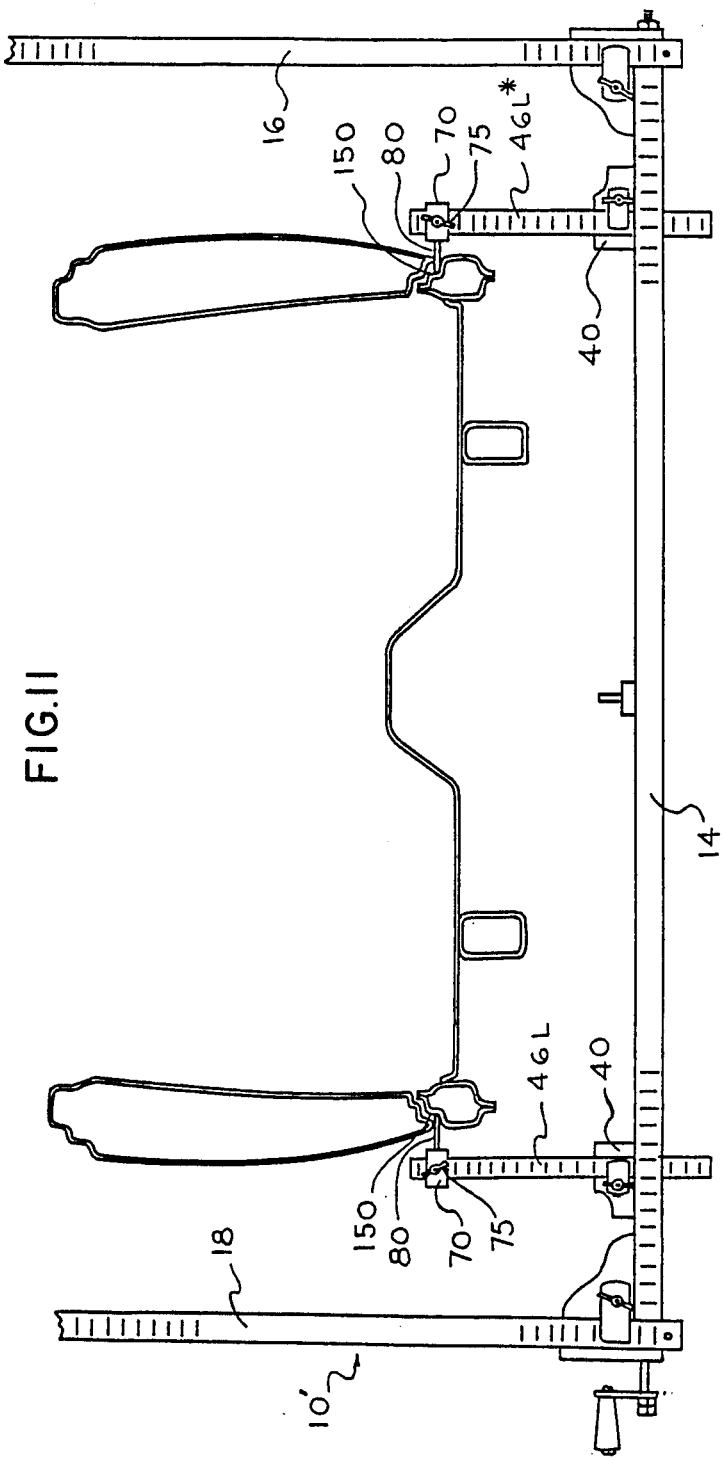
FIG. 11 is, in application, an alternative embodiment of my novel gauge.

Referring to FIG. 4, my gauge 10, as aforesaid mounted according to FIG. 3B, is shown coincident with plane C or D of FIG. 1. As such the upper threading castings are designated 40U; while the corresponding lower threaded castings 40L. The lower threaded castings are now organized by setting the scaled verticals 46L adn 46L* according to the manufacturer's data spec from reading from an equivalent chart as that in FIG. 11. The scales S on the verticals 46L and 46L* may, for instance, be set at 102 mm from the upper end so that the top of the lower cross bar 14 is 102 mm from the upper distal end of each vertical scale. By rotating the crank 19 to locate the vertical scaled piece 46L and 46L* so that the respective upper ends of the two vertical scale pieces strike against the lower margins of the longitudinal frame members 120 and 121 of the vehicle. It is necessary to raise both vertical hangers 16 and 18 at the top cross bar outer casting to their identical positions on the respective scales S so that the ends of the vertical scaled pieces 46 L and 46L* are just almost touching (the lower outer margins of both of the frame rails 120 and 121). If both vertical scales on 46L and 46L* are the same distance to the bottom of the frame members 120 and 121 respectively, and if both vertical hangers are set to the same position on their scale, then the height of the body is correct, ie. identical, as indicated by the two phantom lines indicated in FIG. 4 as X and O. The top of the lower cross bar 14 now is on the datum plane, the datum line as the manufacturer's specifications would indicate according to a prior art FIG. 12 and this is shown to be the case in FIGS. 7, 8 and 9. Now by adjusting the threaded slides 40, by rotating cranks 19, either in or out so that the inner or outer top corner of the vertical slides are in the identical positions corresponding to the frame rails 120 and 121, as illustrated in FIG. 4, this will indicate that the section of the vehicular body is "square", i.e. symmetrical to the manufacturer's specifications, with no diagonal misalignment conditions present (for example as shown in phantom in FIG. 6), but on the other hand, if there be damage, it will be indicated by conditions as seen in FIGS. 5 and 6.

Referring to FIG. 4, it is to be assumed in this figure that there has been no damage to the vehicle in any planes, for instance in plane C; the dimension D, D' and D", should be accordingly be identical on opposite lateral margins or sides of the car. Thus, similar dimensions, family d, along the left hand surfaces of the vehicle can be taken and these should correspond to the family of dimensions D. The dimension on scales 46L and 46L*, when compared to datum reference, should identify the vehicle as being mated to datum throughout that plane.

Figure 5:
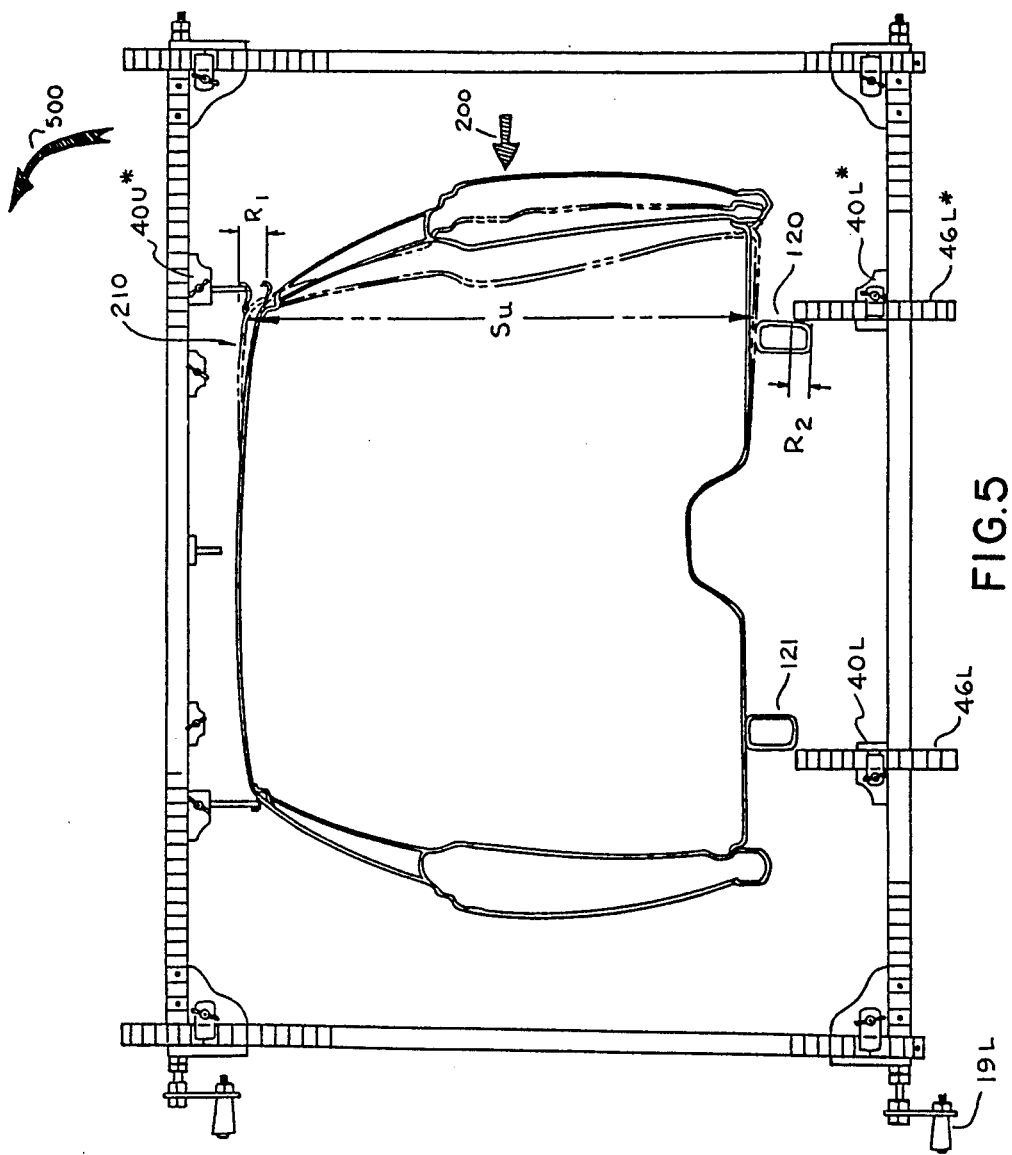
FIG. 5 is the identical view of FIG. 4, but with side panel damage, and vehicle distortion associated therewith, shown in phantom.

Referring to FIG. 5 and assuming damage having occurred as a result of compression pursuant to arrow 200, distorting the body frame into the phantom position shown, the upper roof will be distorted as shown in phantom by arrow 210, upward, distorted into a representative phantom position shown. What is shown in phantom is the distorted vehicle portion; what is shown in solid, the undistored portion and hence the gauge is shown in its distorted location. The dimensions $R_1$ and $R_2$ are the respective distortions of the roof and of the floor panel; resulting from an increasaed length, $S_u$ between inner roof surface and inner floor panel surface; the respective distortions of the side wall not being dimensioned for clarity. Therefore, when the scales 46 are set according to datum, and hence according to FIG. 4, on damage, the vertical scales will appear as in FIG. 5 and therefore the vertical scale 46L* indicates the amount of increase in height, being dimension $R_2$, in FIGS. 5 and 5A, resulting from the impact according arrow 200. Similarly, but not shown in FIG. 5, corresponding distances to those corresponding for D, D', and D", as illustrated in FIG. 4, can be taken of the side wall of the damaged vehicle in FIG. 5 and hence a precise determination of the amount of damage incurred so that it may be restored to its required factory or symmetrical dimension. Although in FIG. 5, the roof and the floor are shown distorted into phantom, there may not be damage to them directly, that is damage in the sense that the roof or floor have been bent or dinted; but thay have been pushed or distorted out of appropriate symmetrical position into the phantom shown and thus a resultant dimension $S_u$ is changed. When the phantom wall in FIG. 5 is restored, the dimension $S_u$ should likewise be restored to datum and the dimension $R_2$.

Figure 5A:
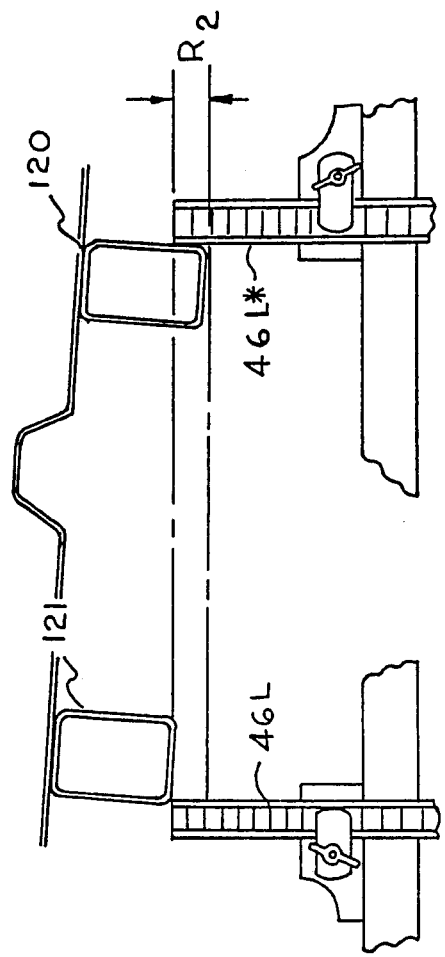
FIG. 5A is an exploded plan view, in section, of the lower cross arm of the gauge of FIG. 5 and its relative measuring relation to the underside of the vehicular frame.

Thus, referring to FIG. 5A and initially assuming for discussion, at this point, no misalignment at the roof (although that will normally be an error in reality because there is virtually always misalignment at the roof if there be severe damage to the side wall), there likely will be movement of the floor panel into the phantom portion, as shown, increasing distance $S_u$, positioning the locataion of the scale end 46L* above the lower margin of the tubular member 120, so that its end is positioned past the lower margin a distance $R_2$ above what it was prior to damage and at which scale 46L* had been located in FIG. 4. Note, that because of the upward movement of the roof in FIG. 5 into the phantom position, the whole gauge rotates slightly counter-clockwise as indicated by the arrow 500; that is the upper cross bar 12 has been moved a dimension $R_1$ higher at its right hand casting 40U* by the dimension $R_1$. This, in fact, will raise, similarly, the upper end of the scale 46L* a dimension $R_2$ from the bottom of the longitudinal member 120' (because of the rotation 500). This differential and distortion is illustrated in the full FIG. 5A and it will be seen therefore that the body would have to be reorganized to relocate the longitudinal member 120 up into the solid position from the phantom position of FIG. 5 and, hence reduce the dimension $R_2$ to 0. In reality, what is more likely to happen as a result of an impact 200, is the resultant shown in FIG. 6 wherein the whole upper part of the body of the vehicle has been tilted to the left, i.e. sectional diamond distortion. In fact, diamond distortion is most common.

For simplicity, and referring to FIGS. 1 and 6, it will be assumed that there has been some diamond distortion, i.e. an impact on the one side of the passenger compartment, tilting top of the body compartment to the left as seen in FIG. 6 and hence into the phantom position shown. If this damage had not occured, then the true cross-sectional dimensions within the passenger compartment would be that of "A".

On distortion because of the damage, of course, the internal dimensions are now respectively A' and A".

Referring to the figure, it will be seen therefore that the upper gutter 114 has moved to the left and, as will become apparent, has moved the dimension $A_1$. If my gauge were moounted on the vehicle, according ot FIG. 3B, in its undamaged state, stem 52 would be located at position 52* as seen in FIG. 6 where in fact because of movement of the roof to the left into the phantom stem 52 finds itself located at position 52**. The shift between 52* and 52 is dimension $A_1$ and hence the location of the phantom gauge 10. It is from this location, therefore, that the various dimensions of the side panel etc. may be taken since that will actually be the location of the gauge on the damaged vehicle. Lateral margins are therefore dimensioned as seen in the figure and hence lateral dimensions $D_1$, $D_1'$, $D_1''$, and the corresponding dimensions $D_2$, $D_2'$ and $D_2''$ are derived.

Because of the damage and the gauge being carried with the roof, as in FIG. 6, the right hand most lower threaded block 40L* will have its scale 46L*, and referring to FIG. 6, strike the longitudinal member 120 first leaving the opposite threaded block 40L and scale 46L a dimension $a_2$ away from its longitudinal member 121. The dimension $a_2$, not being 0 advises that the roof section must be shifted to the right so as to close $a_1$ to 0 and hence must be shifted one-half the dimension $a_2$. As the roof is moved back, the lower scales 46L get closer to its longitudinal member 121, while that of 46L* moves to the right and hence away from the longitudinal member 120, an equal distance. Thus the crank 19L must be turned to reset the positions of the lower castings 40L during each step of repositioning of the roof and this allows monitoring of the reconstruction process. As these changes occur, of course, the lateral dimensional changes take place as well to the family of dimensions $D_1$ and $D_2$ and the internal dimensions A' and A" begin to approach the original internal cross dimension A.

It will be appreciated that similar measurements can be made through each of the respective planes.

Figure 7:
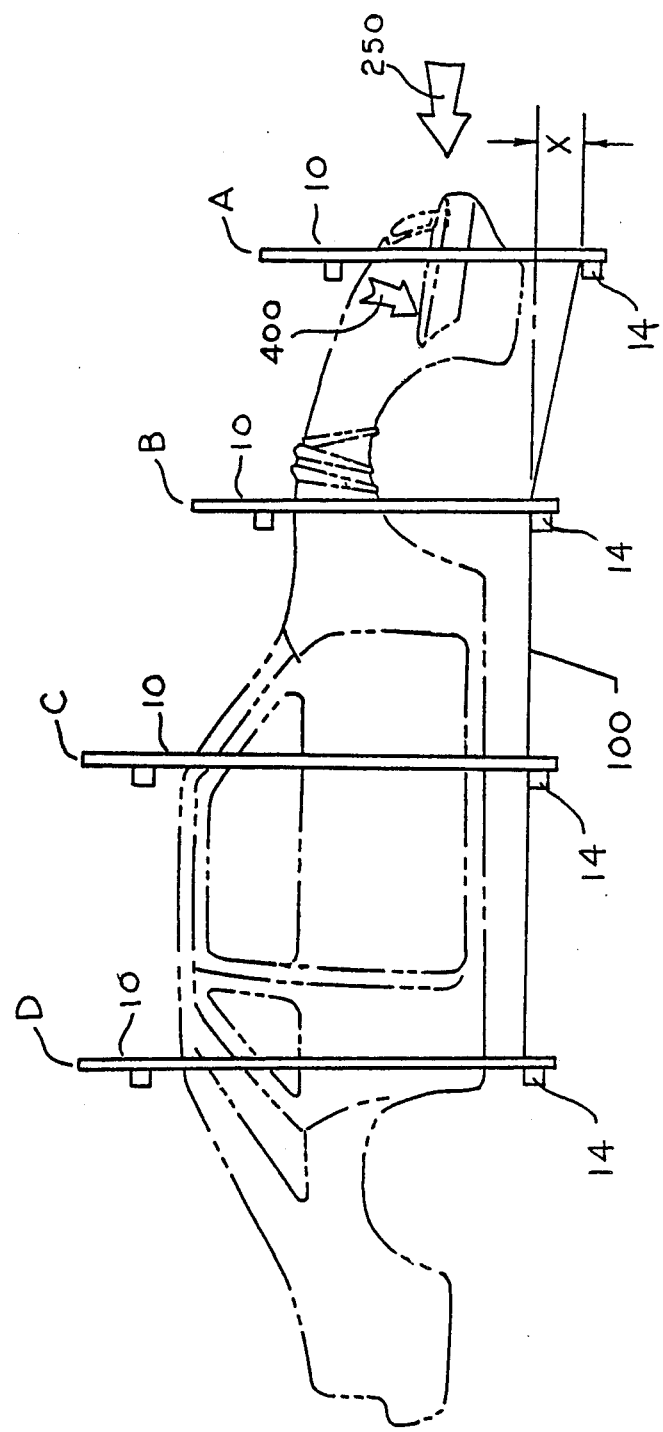
FIG. 7 is a side elevational view of an automobile with front end damage causing initial front section kick down between planes A and B.
Figure 8:
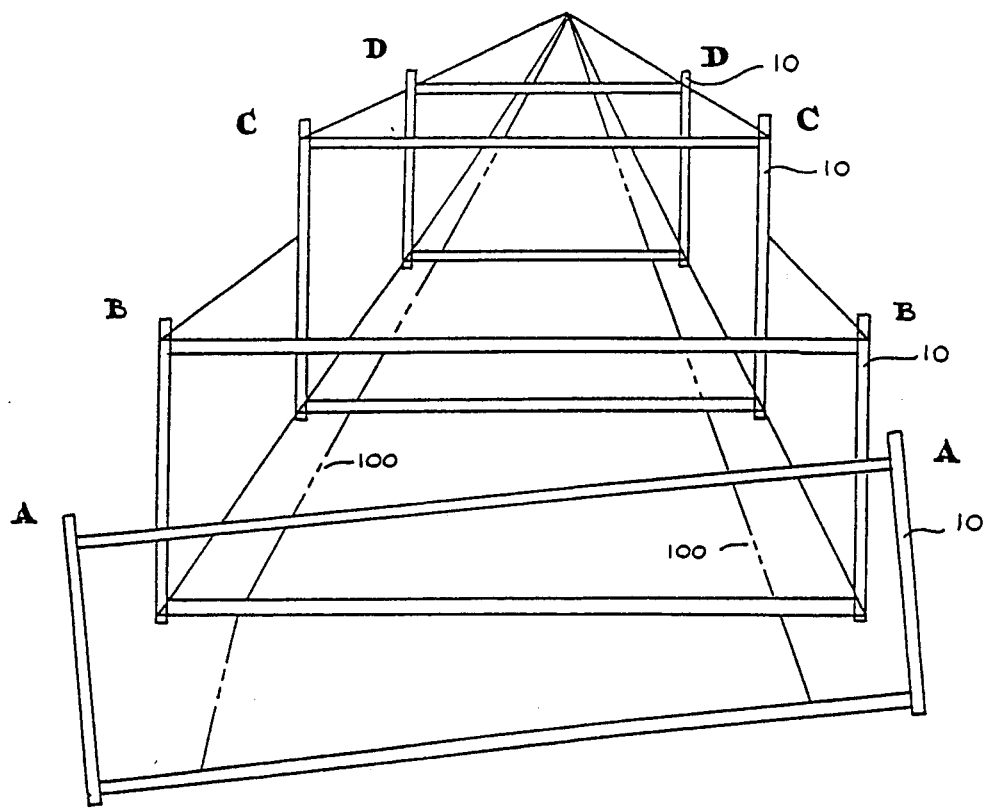
FIG. 8 is a "front" perspective for explanation purposes of the vehicle of FIG. 7 with the gauges located in various planes according to my invention, the vehicle in FIG. 7 removed for clarity, showing typical gauge positions in each of the first four planes.
Figure 9:
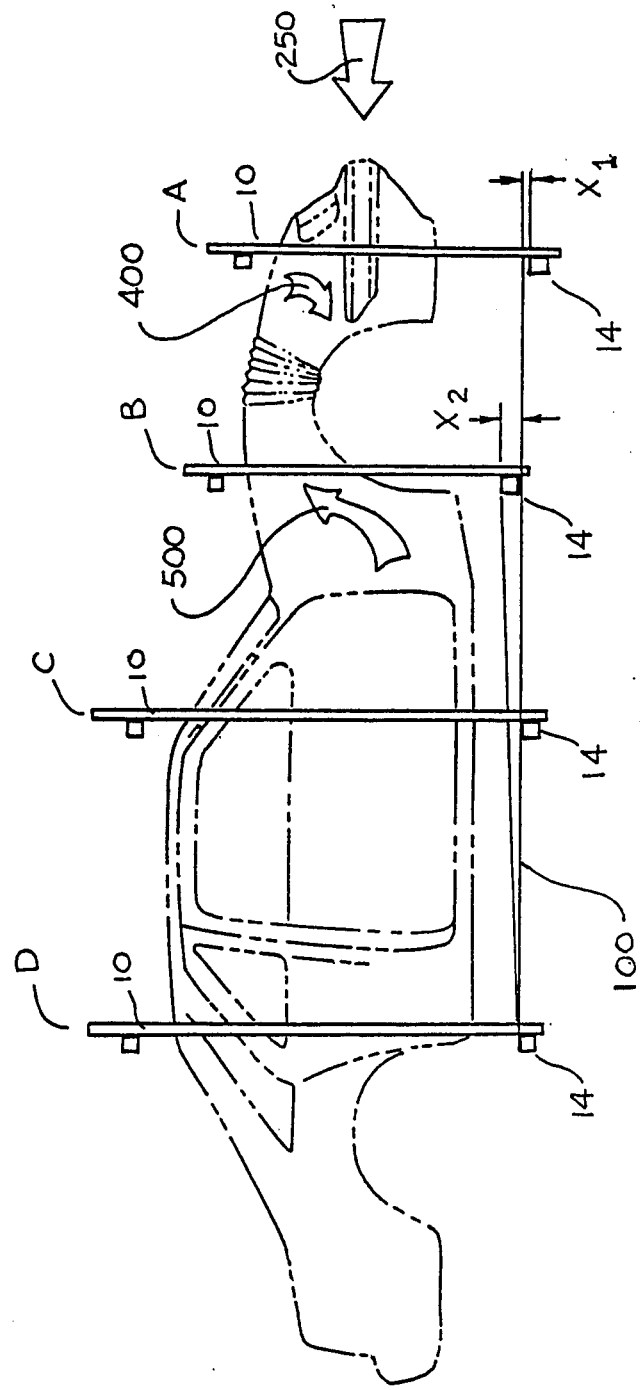
FIG. 9 is the view of FIG. 7, wherein the second stage of front end damage exists (more severe) also causing body rise between planes B and C.

Referring now to FIGS. 7, 8 and 9 therefore, where a vehicle is hit, not at the passenger compartment as earlier described, but as a result of a front end collision, and referring to FIG. 7, on front end collision, a force by arrow 250 occurs, causes downward dip at arrow 400 and distortion of the right front corner of the vehicle downward by the dimension X. This dimension can be identified by placing one of the gauges 10 in plane A and in at lease two and preferably three undamaged planes, namely planes B, C and D where no distortion has taken place. What should be a bottom horizontal datum plane for the vehicle, plane 100, should be coincident to the upper edge of the lower cross member 14 of the 4 gauges. Gauge 10 located in plane A, of course, has its lower margin subjacent to the datum line therefore by dimension X and hence that is the amount of downward dip of the vehicular front.

Those skilled in the art will appreciate therefore that if one takes a front end view, and referring to FIG. 8, and for a clearer explanation of the position of the gauges, removes the distorted vehicle from FIG. 8, the gauges in each of the respective planes A through D would appear as shown on FIG. 8. Each lower cross bar being set that its top edge is at the datum place 100 of FIG. 7, but because of the frontal kick down damage on the right side of the vehicle the front gauges in plane A is twisted or tilted out of alignment relative to the others in planes B, C and D.

Referring to FIG. 9 and assuming a greater front end collision impact by arrow 250, a second stage of damage occurs wherein the upper end "swings up" as a result of twist of the body section according to arrow 500 in the region between planes C and B. In plane B, the lower section will have risen a dimension $X_2$ higher than what would have been the datum plane 100; allowing a differential, because of downward dip of the front by arrow 400 of only $X_1$, the dimension between datum plane 100 and the upper margin of the cross member 14 in plane A. It will be appreciated, of course, that the dimension X in FIG. 7 corresponds to $X_1+X_2$ in FIG. 8.

A corresponding frontal view of FIG. 9 damage would indicate the complete gauge A having less tilt than in FIG. 8. The cross bar 14 of gauge A being at an elevation lower than the others in planes C and D that are at datum as viewed on the left side. Similarly, the gauges in plane B would be tilted in the opposite direction with its cross bar 14 indicating, when viewed on the left side as being at a higher elevation than the cross bars 14 of gauges in planes C and D, set at datum. The vehicle damage would be grought back until both lower cross bars 14 of gauges in planes A and B are on datum; plane 100.

Now it should become apparent to those skilled in the art that although I prefer to set the lower cross bar 14 of the gauges that are located in planes A and B into the datum plane 100 by adjusting each of the scaled vertical members 16 and 18 of these gauges to be clamped by the end blocks 30 and 20 thereof on the upper cross bar 12 at the same scaled marking, for example 175 mm, alternatively, as long as the vertical scales S of each of the vertical members 16 and 18 intersect the upper cross bar at a common dimension from the lower cross bar 14 and hence are "equidistant", the guage is rectangular and hence orthogonal at all its corners. If both gauges in these planes A and B are so set, the lower cross bars 14 of each will be in the same plane and that plane will be parallel to the datum plane 100. So long as the planes are relatively parallel to datum, the aforesaid procedure will result in accurate measurement.

Figure 10:
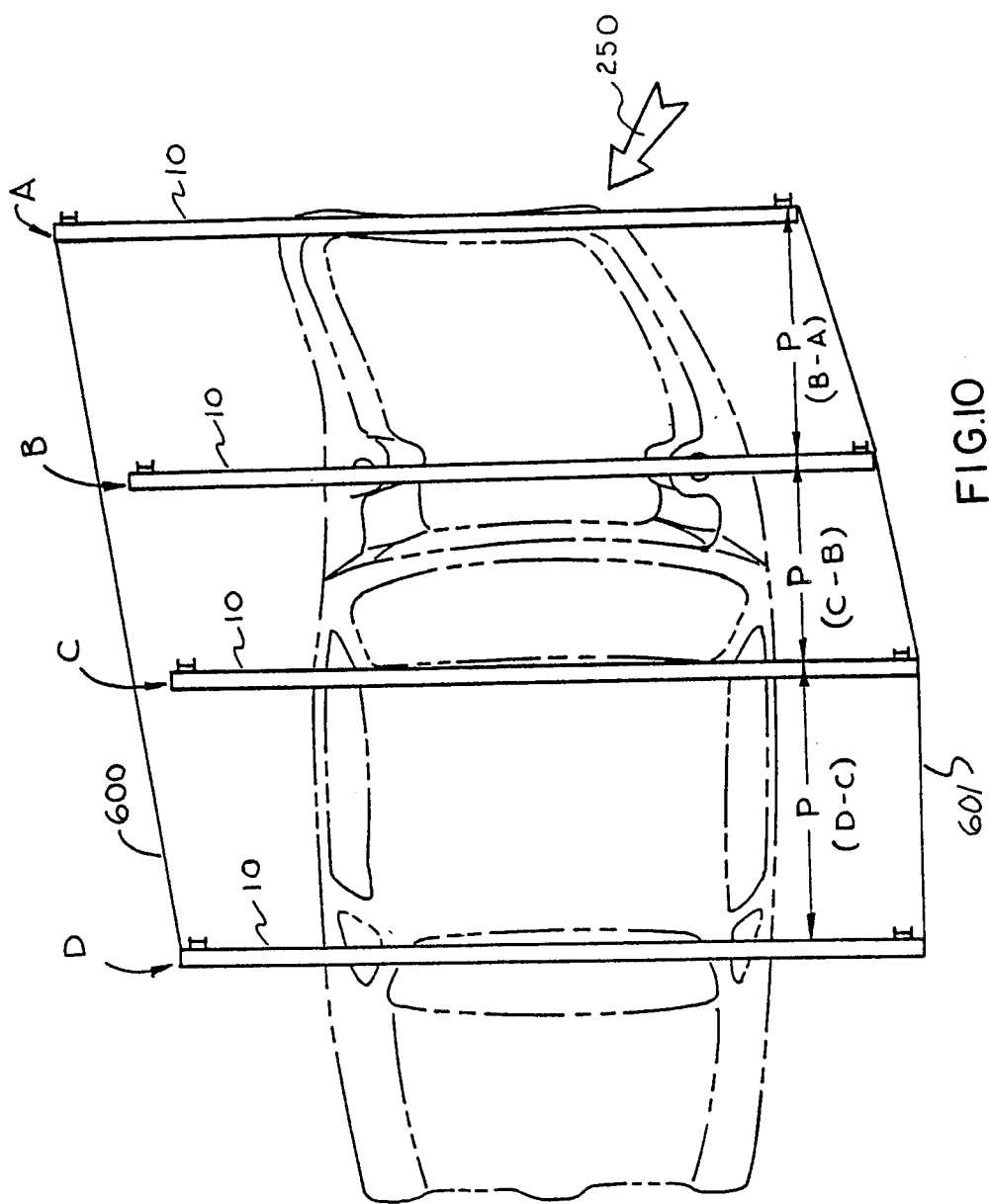
FIG. 10 is a top plan view of another typical damaged vehicle showing front end sway, typically found with front end damage.

In a similar fashion, and referring to FIG. 10, is the plan view of the vehicle distorted into a sway position, wherein the front end impact 250 is not "head on" but to the side, hence causing "shift" of the front end as shown into the phantom position in that figure. By taking the cord lines 600 and 601 and comparing them with the vertical hangers' alignment to each other and one can also sight on the centre pins 26 of FIG. 1, one will appreciate the deviation and shift as a result of the phantom sway of the front end resulting from the impact front end collision 250. Those skilled in the art will appreciate that the front end has to be "brought back in line" so that the respective cord lines 600 and 601 are "parallel" to each other and just touching each vertical bar. Further, if there be "accordian" in vehicle damage, the distance between the respective adjacent planes, for instance, the distance between A and B will change if there be damage in that region; similarly, as between B and C, C and D; and, D and E respectively shown in FIG. 10 as dimensions $P_{(a-b)}$; $P_{(c-b)}$; etc. Restoration of the vehicle is therefore easily accommodated by those skilled in the art.

In another embodiment of my novel gauge, and referring to FIG. 12, the top cross bar 12 is omitted. The gauge 10 may be composed, therefore of the two vertical members or hangers 16 and 18 each with scale S and a single lower cross bar 14 with the two end castings 20 and 30 and carrying reversely threaded screw 15 and crank 19, which drives threadable blocks 40 to and from in a like manner as my earlier embodiment, shown and described. In this instance each the lower adjustable scales 46L and 46L* are releasably mounted on the threaded block 40 and the scales have an additional block 70 fastened to the distal end by a convenience thumb screw 75. The thumb screw engages block 70 at the end of the scales 46L anad 46L* and sustains a laterally depending pin or stem 80. This lateral pin or stem 80 is hooked into the bottom running sill 150 of the vehicle to hang the gauge 10.

The position of the lower cross bar 14 can be set at datum. However, this is not necessary for checking sway or front section twist. In this application, the cross bar 14 is set parallel to the datum plane 100. This may be accomplished by setting the vertical scales 46L and 46L* at the identical intersect position with a cross bar 14, and the blocks 70 at the identical position on each of the lower scales 46L and 46L*. Turning the crank 19 moves the threaded castings 40 equal amounts to lock the stems 80 into the sill 150 and centre the vehicle between the two outer vertical members or hangers 16 and 18. The lower cross bar centre pin 26 is thus at the centre line of the vehicle, and in line with the other centre pins of the adjacent gauges located in each of the other planes.

The outer vertical members 16 and 18 of the adjacent gauges can be interconnected by stretching string therebetween alternatively sighting between adjacent gauge hanges with light beams such as laser or ultra-violet, to the hangers or even sighting with the eye of the centre pins of adjacent gauges, checks for sway. The adjacent cross bars can also be stretch stringed or sighted for being horizontally parallel with each other.

The embodiments of the invention in which an exclusive property or privilege is claimed are defined as follows:

1. A vehicle body-and-frame measurement gauge for use in realigning the structure of a damaged vehicle having reference points comprising:
   (a) two vertical members, each identically scaled with indicia along one surface thereof;
   (b) a pair of cross bars with opposite ends each having its longitudinal length scaled and carrying;
      (i) means at either end for attachment to one of each of the vertical members whereby to arrange the vertical members and the cross bar into a generally U-shaped configuration;
      (ii) a pair of adjustable block means carried by the cross bar adapted to be adjustably positioned therealong; and,
      (iii) means for adjusting the adjustable block means, simultaneously, an equal dimension toward or away from each other, and as well, from the respective near ends of the cross bar.

2. The gauge as claimed in claim 1, including a reverse thread screw carried by the cross bar, and adapted to threadingly engage each of the adjustable block means including means at one end of the reverse thread screw for rotating the same thereby moving the threaded block means toward or away from each other equal distances.

3. The gauge as claimed in claim 2, wherein the block means define a threaded aperture through which the reverse thread screw extends.

4. The gauge as claimed in claim 1, wherein each adjustable block means includes means for carrying a secondary scaled member thereon.

5. The gauge as claimed in claim 1, wherein each adjustable block means includes means for carrying a secondary scaled member thereon including means on the adjustable block means for adjusting the relative position of the secondary scaled member on each block means.

6. The gauge as claimed in claim 1, wherein the length of the cross bar and the vertical members is 2 meters.

7. The gauge as claimed in claim 1, wherein the length of the cross bar and the vertical members is 2 meters and the cross bar is scaled with 1000 at its centre and the vertical members are scaled sequentially with one end at 0.

* * * * *